(No Model.)

B. H. MEYER.
CIGAR BUNCHING MACHINE.

No. 436,369. Patented Sept. 16, 1890.

Witnesses
Geo. Wadman
F. W. Peterschen

Inventor
Bernhard H. Meyer,
by Philip J. O'Reilly,
his attorney.

UNITED STATES PATENT OFFICE.

BERNHARD H. MEYER, OF NEW YORK, N. Y.

CIGAR-BUNCHING MACHINE.

SPECIFICATION forming part of Letters Patent No. 436,369, dated September 16, 1890.

Application filed March 10, 1890. Serial No. 343,242. (No model.)

*To all whom it may concern:*

Be it known that I, BERNHARD H. MEYER, of the city, county, and State of New York, have invented new and useful Improvements in Cigar-Bunching Machines, of which the following is a specification.

My improvements relate to cigar-bunching machines, and more particularly to a machine for making cigar-bunches composed wholly or chiefly of booked or flattened-out tobacco-leaves first laid, one on top of the other, and then rolled up together in convolute form and afterward inclosed in a binder, if so desired, a method for which is the subject of a pending application for Letters Patent filed by me on October 7, 1887, and known as Serial No. 251,692.

I will describe a machine embodying my improvement, and then point out the novel features in the claims.

Figure 1:
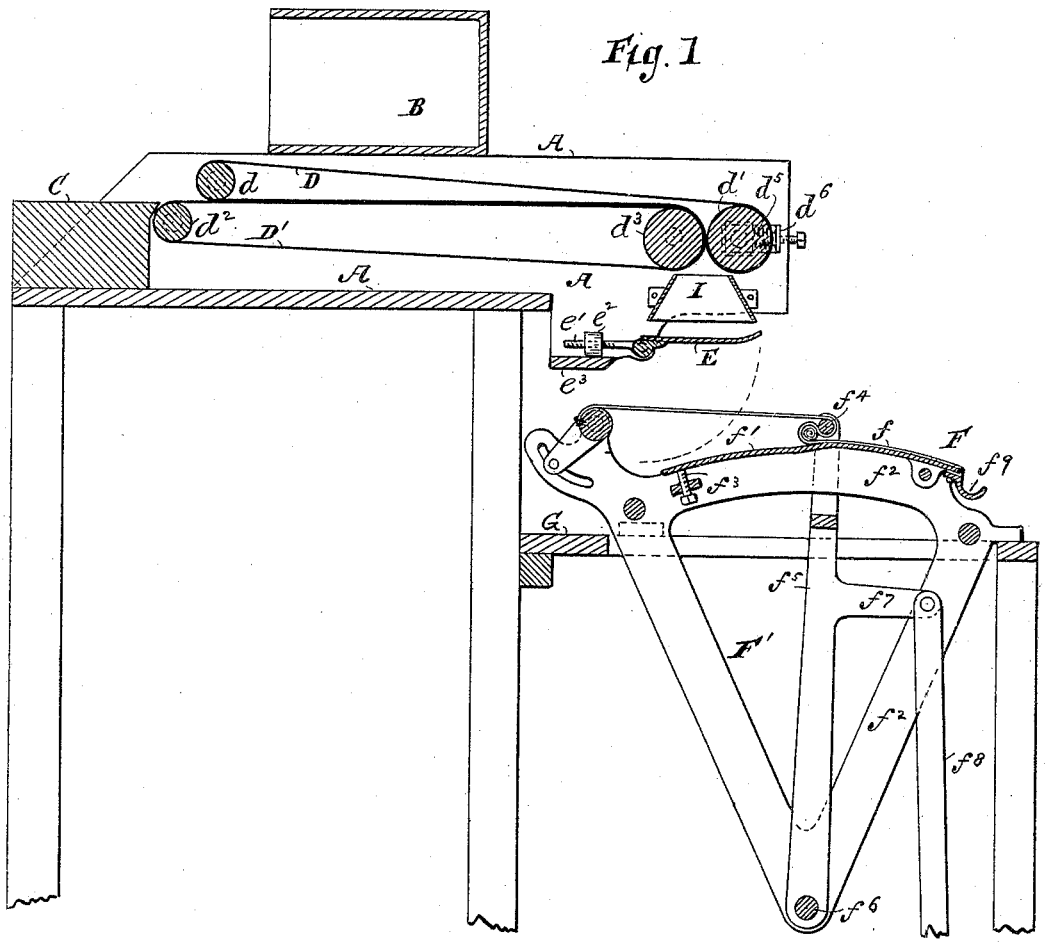
Figure 2:
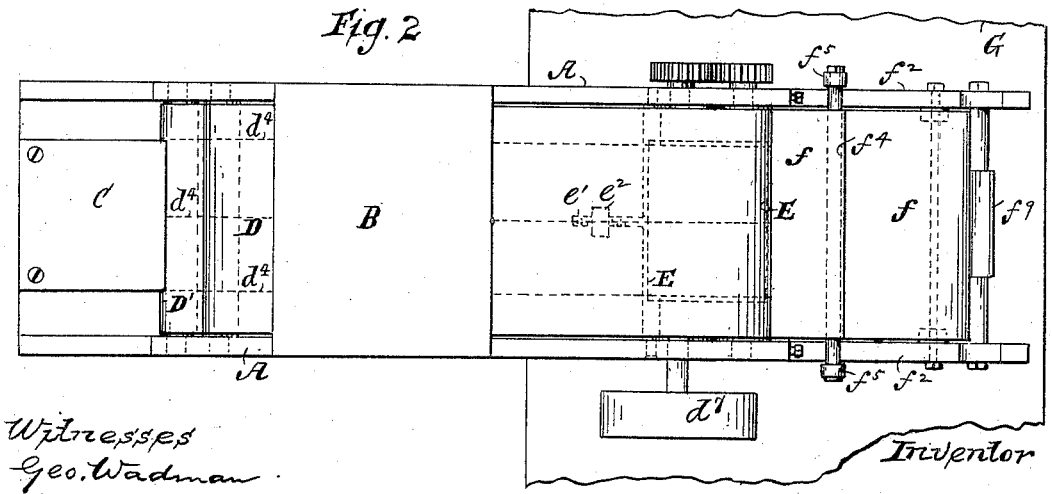

In the drawings, Figure 1 is a longitudinal section of a bunch-making machine constructed according to my invention, and Fig. 2 is a plan of the same.

A designates a frame supporting a box B for containing a supply of booked leaves.

C is a break-table, on which the leaves from the box B are placed, one at a time, by the operator. This table corresponds in length crosswise of the machine to the desired length of bunch, and serves as a gage by which the surplus length of any leaf may be torn off against a side edge thereof. It is detachably secured to the frame A, in order to substitute others of different sizes when required.

D D' are endless belts made of canvas or other suitable flexible material and mounted on rollers $d$ $d'$ $d^2$ $d^3$, supported in the frame A. The adjacent sides of these belts are in close contact and serve to convey the leaves, separately and successively onto a scale E. These belts are provided with longitudinal division-lines $d^4$ $d^4$ $d^4$, preferably formed by colored threads woven therein, and which serve to aid the operator in feeding the leaves, which may differ in width, so that they are delivered on the scale to form a bunch of the desired contour lengthwise.

The roller $d$ is arranged forward of the roller $d^2$ to facilitate feeding the leaves at one end of the machine, and the roller $d'$ is arranged horizontally in line with the roller $d^3$ to cause the leaves to fall vertically at the other end and turn over and lie flatwise on the scale one above the other. The rollers $d'$ $d^3$ are preferably faced with rubber or other elastic material, and the former is journaled in boxes fitted to slide in ways in the frame A, and caused to press on the rear roller by means of coil-springs $d^5$, interposed between the boxes and plates $d^6$, upon which bear set-screws to adjust the pressure. By means of these belts and pressure-rollers the leaves are further flattened out, and when delivered on the scale will lie closely together. The shaft of the roller $d^3$ is provided with a pulley $d^7$ for receiving motion from a suitable motor, and the rollers $d'$ $d^3$ are preferably geared together to insure uniform motion of the belt.

The scale E is made of thin sheet metal curved slightly upward at its forward end, and is pivotally connected to the frame A to rock downwardly from a horizontal position when the desired quantity of leaves for a bunch have accumulated thereon. It is provided with a rod $e'$, on which a counterbalance-weight $e^2$ may be adjusted and secured in position to balance the weight of the scale and leaves thereon. When the scale rocks downwardly, the pile of leaves is deposited onto a rolling-table or onto the apron $f$ of a rolling device F, after which the scale automatically returns to its normal or horizontal position against a stop $e^3$. This scale is so arranged that its central portion is vertically under the meeting sides of the rollers $d'$ $d^3$, and having a space of four inches approximately therefrom.

I is a guideway secured to the frame-work A, and serves to direct the leaves so as to fall on the scale and lie one above the other. This guideway comprises four side portions forming a rectangular opening at the top and having the front and rear sides flaring outwardly to form an opening at the bottom corresponding to the size and form of the platform of the scale E.

The device F is adapted to roll the pile of leaves up together into convolute form and afterward inclose the whole within a binder, if so desired, and consists of a table $f'$, having its front portion pivotally connected to the side pieces $f^2$ of a frame F', secured to a table G, and its rear portion resting on a screw $f^3$, by which this latter portion may be adjusted vertically.

$f^4$ is a bunch-forming roller journaled in the bifurcated end of a lever $f^5$, secured to a rock-shaft $f^6$, journaled in the side pieces $f^2$. This lever is provided with an arm $f^7$, to which a link $f^8$ is connected and which extends to a treadle by which a to-and-fro motion is imparted to the roller $f^4$ over the table $f'$. This table has the front portion of its surface higher than that of its rear portion, both being concentric with the center of motion or sweep of the roller $f^4$, and joined by a short intermediate inclined portion. The difference between the heights of the front and rear surfaces depends on the desired diameter of the bunch. This construction of a rolling-table is equally applicable to those over which the bunch-forming roller moves in a straight and horizontal line. In such case the front raised portion and rear lower portion are both straight and parallel approximately to the line of motion of the bunch-forming roller and are joined by a short inclined portion, as before described.

$f$ is an ordinary apron secured and adjusted in the usual manner.

By this construction of the surface of the table sufficient space is afforded between the roller $f^4$ and the apron $f$ to enable the bight of the latter to operate in the usual manner when advanced to roll up the pile of leaves constituting the filler into convolute form after it has been deposited on the apron in the manner described. By the time the higher surface of the table is reached by the roller in operation, which position is shown in the drawings, the filler is convolutely rolled into form ready to receive a binder, if so desired, which is placed on the apron in the usual manner above the inclined portion, and by reason of the reduced space between the roller and this raised portion of the table the binder is effectually wound around the filler on the further advance of the roller and the whole deposited in a receptacle $f^9$.

Having now described my invention, what I claim as new, and desire to secure by Letters Patent, is—

1. In combination, a break-table corresponding in length to the required length of bunch, two endless feed-belts mounted on rollers, the rear upper roller being arranged forward of the rear lower roller, and the two forward rollers being arranged horizontally in line and faced with elastic material, means for producing a pressure between the two latter rollers, a rolling-table, and means located between said feed-belts and rolling-table for delivering a predetermined amount of tobacco-leaves from the feeding devices to the rolling-table, substantially as described.

2. In a cigar-bunch-rolling device, a rolling-table having the front portion of its surface higher than the rear portion thereof, and both being approximately parallel with the line of motion of the bunch-forming roller and joined by a short intermediate inclined portion, substantially as described.

3. In a cigar-bunch-rolling device, substantially as described, a rolling-table having the front portion of its surface higher than that of its rear portion, both being concentric approximately with the center of the to-and-fro motion of the bunch-forming roller, and the two portions being joined by a short intermediate inclined portion, substantially as described.

4. In a cigar-bunching machine, the combination of feed-belts and delivery-rollers with a scale made of thin sheet metal curved slightly upward at its forward end and pivotally connected to the frame of the machine to rock downwardly from a horizontal position, and provided with a rod on which a counterbalance-weight may be adjusted and adapted to be held normally in a horizontal position against a stop, substantially as described.

5. In a cigar-bunching machine, the combination of feed-belts, delivery-rollers, scale, and a fixed guideway interposed between said delivery-rollers and scale and having its side portions flaring outwardly, substantially as described.

6. In combination, two endless feed-belts mounted on rollers, the rear upper roller being arranged forward of the rear lower roller, and the two forward rollers being arranged approximately horizontally in the same line and faced with elastic material, means for producing a pressure between the two latter rollers, a suitable cigar-bunch-rolling table, and means located below said feed-belts for delivering a predetermined amount of tobacco-leaves to said table, substantially as described.

BERNH. H. MEYER.

Witnesses:
PHILIP J. O'REILLY,
F. W. PETERSCHEN.